United States Patent
Konen et al.

(10) Patent No.: US 11,172,092 B2
(45) Date of Patent: *Nov. 9, 2021

(54) AUTOMATED DEFINITION OF SYSTEM BEHAVIOR OR USER EXPERIENCE BY RECORDING, SHARING, AND PROCESSING INFORMATION ASSOCIATED WITH WIDE-ANGLE IMAGE

(71) Applicant: ImmerVision, Inc., Montreal (CA)

(72) Inventors: Pierre Konen, Saint-Bruno (CA); Pascale Nini, Orford (CA); Jocelyn Parent, Montreal (CA); Patrice Roulet, Montreal (CA); Simon Thibault, Quebec (CA); Hu Zhang, Montreal (CA); Marie-Eve Gosselin, Montreal (CA); Valentin Bataille, Montreal (CA); Xiaojun Du, Montreal (CA)

(73) Assignee: IMMERVISION, INC., Montréal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,633

(22) Filed: Jan. 12, 2021

(65) Prior Publication Data

US 2021/0136246 A1   May 6, 2021

Related U.S. Application Data

(63) Continuation of application No. 16/682,640, filed on Nov. 13, 2019, now Pat. No. 10,924,623, which is a
(Continued)

(51) Int. Cl.
*H04N 1/21* (2006.01)
*G06T 11/00* (2006.01)
*H04N 5/217* (2011.01)

(52) U.S. Cl.
CPC ............ *H04N 1/2112* (2013.01); *G06T 11/00* (2013.01); *H04N 5/217* (2013.01)

(58) Field of Classification Search
CPC ............ H04N 1/2112; H04N 1/00002; H04N 1/00005; H04N 1/00037; H04N 1/00079;
(Continued)

(56) References Cited

U.S. PATENT DOCUMENTS 6,434,701 B1 * 8/2002 Kwan .............. G11B 20/00086
382/194
7,313,696 B2 * 12/2007 de Queiroz ............. G06T 9/007
380/203
(Continued)

FOREIGN PATENT DOCUMENTS

CN    101682686 A    3/2010
CN    102349288 A    2/2012

OTHER PUBLICATIONS

Office Action dated May 8, 2021 in Chinese Application No. 201911391705.

*Primary Examiner* — Pritham D Prabhakher
(74) *Attorney, Agent, or Firm* — Panitch Schwarze Belisario & Nadel LLP

(57) ABSTRACT

Systems and methods in accordance with the invention allow automatic recording, sharing, and communicating of different parameters associated with images and their imager to define a specific system behavior of a display device or an algorithm unit. Examples of information include imager parameters, environment parameters, image processing and enhancement parameters, coordinates of a section of wide-angle scene image content, display parameters, defined user experience, defined system behavior or any information to be recorded, shared, and communicated. To avoid loss of information, the information is encoded directly in the picture using a marker. This way, the information is robustly
(Continued)

transferred from the imager to the display unit. According to the information, the final image can be automatically corrected and enhanced before display, different associated parameters can be displayed on final image or be used with another output. The end user experience or system behavior can thus be defined and be reproduced.

26 Claims, 6 Drawing Sheets

Related U.S. Application Data continuation of application No. 14/668,314, filed on Mar. 25, 2015, now Pat. No. 10,516,799.

(60) Provisional application No. 61/970,159, filed on Mar. 25, 2014.

(58) Field of Classification Search
CPC .......... H04N 1/00092; H04N 1/32144; H04N 1/32154; H04N 1/3216; H04N 1/32203; H04N 1/32208; H04N 1/32219; H04N 5/217; G06T 11/00; G06T 1/0064; G06T 7/0002; G06F 21/00; G06F 17/26; G06K 7/1417; G06K 7/1447; G06K 9/00442; G06K 19/06037; G06K 19/06046; G06K 19/14; G06K 19/18; G06Q 20/1235; G06Q 20/341; G06Q 20/40145; G07C 9/00079; G07F 7/08; G07F 7/086; G07F 7/1008; G07F 7/1016; G07F 7/12; G11B 20/00086; G11B 20/00094; G11B 20/00115; G11B 20/00166; G11B 20/0021; G11B 20/00507; G11B 20/00774; G11B 20/00891
USPC ...................................................... 348/231.6
See application file for complete search history.

(56) References Cited

U.S. PATENT DOCUMENTS

| | | | |
|---|---|---|---|
| 8,339,415 B2* | 12/2012 | Sekizawa | G11B 27/329 345/619 |
| 8,935,536 B2* | 1/2015 | Nakagata | H04N 1/32288 713/189 |
| 9,591,149 B2* | 3/2017 | Di Censo | H04N 1/00129 |
| 2007/0002372 A1* | 1/2007 | Sekizawa | H04N 19/597 358/1.15 |
| 2010/0008538 A1* | 1/2010 | Rodriguez | G01S 19/14 382/100 |
| 2012/0121086 A1* | 5/2012 | Nakagata | G09C 5/00 380/243 |
| 2013/0286199 A1* | 10/2013 | Di Censo | H04N 1/00129 348/143 |

* cited by examiner

AUTOMATED DEFINITION OF SYSTEM BEHAVIOR OR USER EXPERIENCE BY RECORDING, SHARING, AND PROCESSING INFORMATION ASSOCIATED WITH WIDE-ANGLE IMAGE

CROSS-REFERENCE TO RELATED APPLICATIONS

This application is a continuation of U.S. patent application Ser. No. 16/682,640, filed on Nov. 13, 2019, entitled "Automated Definition of System Behavior or User Experience by Recording, Sharing, and Processing Information Associated with Wide-Angle Image," currently pending, which is a continuation of U.S. patent application Ser. No. 14/668,314, filed on Mar. 25, 2015, entitled "Automated Definition of System Behavior or User Experience by Recording, Sharing, and Processing Information Associated with Wide-Angle Image," now U.S. Pat. No. 10,516,799, which claims the benefit of U.S. Provisional Patent Application No. 61/970,159, filed on Mar. 25, 2014, entitled "Automated Identification of Panoramic Imagers for Appropriate and Efficient Panoramic Image Distortion Processing System," the entire contents of all of which are incorporated by reference herein.

BACKGROUND OF THE INVENTION

The present invention relates to recording, sharing, and communicating information associated with an imager to define the system behavior. It includes how to create wide-angle image or video encoded with information by wide-angle imagers and how to automatically decode and apply the information and image processing or display. The information is ultimately used to define a specific system behavior or user experience based on the parameters.

Using image or video, a user can record, share, or communicate information. In addition to the image or video content, there is also a lot of information associated with the content. This information is in the form of imager parameters, such as, but in no way to limited to, wide-angle device parameters, environment parameters, image processing, enhancement or display parameters, system behavior, user experience, or any other information to be recorded, shared, or communicated.

An existing well-known method to transfer some important parameters from an imager to an end user is the use of metadata and the like. Metadata is text information usually written in the header of a digital image file. This header is a part of the file before or after the actual image data particular to each file format. However, metadata is subject to loss of information when the image or video file is converted to another format or when it is transferred through different media, such as the Internet. It is also impossible to transfer metadata through a printed or scanned image. Thus, the use of metadata and the like is not a robust method to transfer information associated with wide-angle images or videos.

One kind of important information associated with wide-angle image or video are the imager parameters. Wide-angle imagers produce two-dimensional (2D) images from a real-world environment by remapping the object to the image, creating distortion or discontinuity in the images produced. No matter the kind of wide-angle imager used, from lenses to catadioptric systems and including imagers stitching some narrow-angle images together or imagers producing separated unstitched narrow-angle images, the final wide-angle image will always include some distortion or image remapping to present an environment in a 2D plane. The consequence of image remapping is that images are deformed in such a way that straight lines in the object environment appear curved, piecewise linear, or discontinuous in the wide-angle image depending on the type of imager.

To properly display a part of the image to a user or to an algorithm, a correction of the distortion is usually done as in U.S. Pat. No. RE44,087 E1 for linear distortion or U.S. Pat. Nos. 6,844,990 B2 and 6,865,028 B2 for custom symmetric and custom asymmetric distortion, respectively. To properly correct the distortion, the algorithm has to know the different parameters of the imager, including the exact distortion profile, the field of view, the position of the optical center of the image, and the spatial orientation of the wide-angle imager. However, with the above prior art, the distortion processing algorithm is either tied to a single wide-angle imager with the parameters pre-coded inside or requires manual selection of different parameters from an end user. The end user often doesn't have the exact knowledge of the parameters, making the distortion processing tedious and imperfect and a process to transfer the required parameters is required.

In the case of stereo image processing, the use of a bar-code added in the margin of an image file combining the two required images for stereo vision has been proposed in U.S. Pat. No. 8,358,329 B2 to store information from the imager, like the type of stereo image used and the distance between the viewpoints of both images. However, the transmitted data encoded inside the bar-code includes very limited parameters only for stereo images that are combined at the software level by an image synthesis unit.

Lens identification using bar-codes in cameras using analog films to capture images instead of digital sensors has also been proposed in U.S. Pat. Nos. 5,461,440 A and 6,707,998 B2. However, the static encoded data allows only for lens identification and cannot be used dynamically or to transmit changing imager information depending on the specific user application. Similarly, in other systems that use bar-codes or binary codes, the data encoded inside the bar-codes or binary codes are set by the camera manufacturer for a very specific purpose. The output being tied to a single use, it cannot change the output depending on the kinds of parameters that are present in the encoded data or depending on the specific user needs. Furthermore, these systems are static and cannot be used to dynamically encode or transmit changing imager parameters. Because of all these reasons, the encoded data cannot be used to define different system behaviors or user experiences depending on the specific information of the original scene. For optimal wide-angle image processing and to allow the defining of different system behaviors or user experiences depending on the parameters, the information could be added in real-time at the imager level to account for dynamically changing lens, camera, device or environmental parameters, such as the orientation, sub-region of the image transmitted, date, geographical location, or even dynamic distortion as proposed in U.S. Patent Publication No. 2012/0314065 A1.

In International Patent Publication No. WO 2007/110697 A3, a system was proposed to physically mark the optical system or optically add a marker in the image plane to allow identifying a wide-angle optical system. However, if a physical marker on the lens is used, this system still need a manual user external input of parameters at the imager such as the lens identification number or the orientation of the device and the like. When an optical marker is used to appear on the image plane, the system is static and is very limited since it cannot include dynamic encoding of the wide-angle imager parameters like the orientation or the sub-region of the image transmitted. It cannot transmit adapting imager information that depends on the specific user application and thus cannot be used to define different user experience or system behavior. Furthermore, another drawback is that a lens has to be designed from the beginning to include such markers and this method cannot be extended to already existing wide-angle imagers.

In addition to wide-angle device parameters, the present invention provides a scheme to record, share or communicate all kinds of lens, camera, device or environmental information associated with image or video. The scheme can be used in a much wider range of applications. The main innovation is then to be able to define different user experiences or system behaviors automatically by instructing what and how to output depending on the specific parameters. Furthermore, some information is dynamic, such as real-time camera orientation, real-time user experience, real-time system behavior and the dynamic information that cannot be recorded by the static way in the above patents.

BRIEF SUMMARY OF THE INVENTION

To overcome all of the previously mentioned issues, embodiments of the current invention propose a scheme to record, share, or communicate any kind of imager parameter associated with image or video. These imager parameters include all kinds of information associated with the lens, the camera, the full device or the environment around the device. Depending on the specific information of the scene shared, a specific user experience or system behavior is created for the final display device or algorithm unit. This allows the device of the end user to identify all of the imager parameters or other information used and applies the right kind of user experience or system behavior based on the information received. Some examples of specific user experiences or system behaviors that can be created for the end user include image distortion correction, image enhancement or information provision for further processing. All of these can be done automatically without the end user having any knowledge of the imager parameters of the device.

The user experience created by the system affects the human-system interaction and is defined by the imager parameters. It is the user's perceptions and responses resulting from the use and/or anticipated use of the system. User experience includes emotions, beliefs, preferences, perceptions, physical and psychological responses, behaviors and accomplishments that occur before, during and after use of the system. User experience is a consequence of brand image, presentation, functionality, system performance, interactive behavior and assistive capabilities of the interactive system, the user's internal and physical state resulting from prior experiences, attitudes, skills and personality, and the context of use.

The system behavior is the range of actions or processing made by systems in conjunction with themselves (autonomous) or their environment which includes other systems, system users, organisms, artificial entities or physical environment. It is the response of the system to various stimuli or inputs, whether internal or external, conscious or subconscious, overt or covert, and voluntary or involuntary.

Here, a wide-angle imager is any device capable of generating a wide-angle or part of a wide-angle image, including but not limited to wide-angle lenses, multiple-lens systems, catadioptric systems, or wide-angle images generated by any image processing unit. In some embodiments, the imager contains at least one camera module configured to capture an image.

The idea to share the parameters is to add a visible marker on the image inside the imager device to encode different information associated with the scene. Because it is added electronically, the marker can be dynamically updated and includes real-time parameters about the imager, such as spatial orientation, geolocalization, date and time, sensor operating mode, real-time user experience or system behavior, solving the static issue of previously suggested markers. Furthermore, the exact information encoded inside the marker can vary depending on what is required by the application of the end user and depending on the information present, the end user experience or system behavior will be different.

More particularly, in at least some embodiments of the present invention, the associated parameters are all encoded within a marker located inside the image area. Wide-angle images often have regions in the corners of the digital image outside of the scene image content where there is no information about the environment. These corners usually appear black in these images since no light reaches the sensor plane at these positions. In these cases, it is without consequence on the scene image content to place the encoded markers in the corners. In other cases where the scene image content from the environment fills the whole image, as in an equirectangular projected wide-angle image, the image may be enlarged to add a margin where this encoded marker is placed. Placing the marker with encoded parameters inside the image but outside of the scene image content area allows the robust transferring of the whole wide-angle image and all of the associated information without any loss when the image file is processed, streamed online, re-encoded, scaled, or printed/scanned.

Additionally, in at least some embodiments of the present invention, the encoding marker to add inside the wide-angle image by the wide-angle imager is a well-known quick response code (QR-code). In other embodiments, the encoding marker can be any other kind of mark containing encoded information.

In at least some embodiments of the present invention, the information encoded in the marker allows optimal distortion processing. This information could include, without being limited to, the following parameters: a unique lens imager identification code, the complete distortion profile of the wide-angle image in table or polynomial form, the total field of view, the environment footprint in the image, the wide-angle imager spatial orientation and geolocalization coordinates, and/or the position in the image of the optical center. In other embodiments, the information encoded in the marker could include, without being limited to, wide-angle device parameters, environment parameters, image processing parameters, enhancement parameters, display parameters, user experience or system behavior parameters, or any information to be recorded, shared, and communicated between the imaging device and the end user.

In some embodiments of the present invention, there is an advantage when only a part of the full wide-angle image is transferred to reduce the required bandwidth or maximize the frame-rate of the sensor and the display. In that case, the marker could also include the coordinates of the sub-section of the full wide-angle image transferred. This allows the distortion processing algorithm to know of which direction the transferred part of the image is from and then allow optimal distortion processing.

By transferring all of these potential imager parameters inside the image, we ensure that the device of the end user can automatically correct, process, and enhance the image without the end user requiring specific knowledge. This is advantageous compared to existing distortion processing or image processing systems where all parameters require manual input from an end user that does not have the required information. In addition, specific user experiences or system behaviors to output on the display device or an algorithm unit can also be created according to the specific information encoded in marker and according to the application.

In some embodiments of the present invention, the generated user experience or system behavior only includes outputting a processed image to the end user display device. In some other embodiments, the output generated for the end user depends on the encoded parameters and can be outputted to an algorithm unit or can be outputted as any combination of at least one of an image, a text value of a parameter, a light indicator, haptic feedback or a sound or the like.

In some embodiments of the present invention, there is an advantage to use a regular field of view imager instead of a wide-angle imager. In that case, the marker could also include the specific parameters related to this imager required by the application of the end user and depending on the information present, the end user experience or system behavior will be different.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The terminology includes the above-listed words, derivatives thereof, and words of similar import. Additionally, the words "a" and "an", as used in the claims and in the corresponding portions of the specification, mean "at least one."

The system to define user experience or system behavior can be used for sharing marked images between multiples devices or locally inside a single device. Both cases are schematized at FIGS. 1 and 2, respectively.

Figure 1:
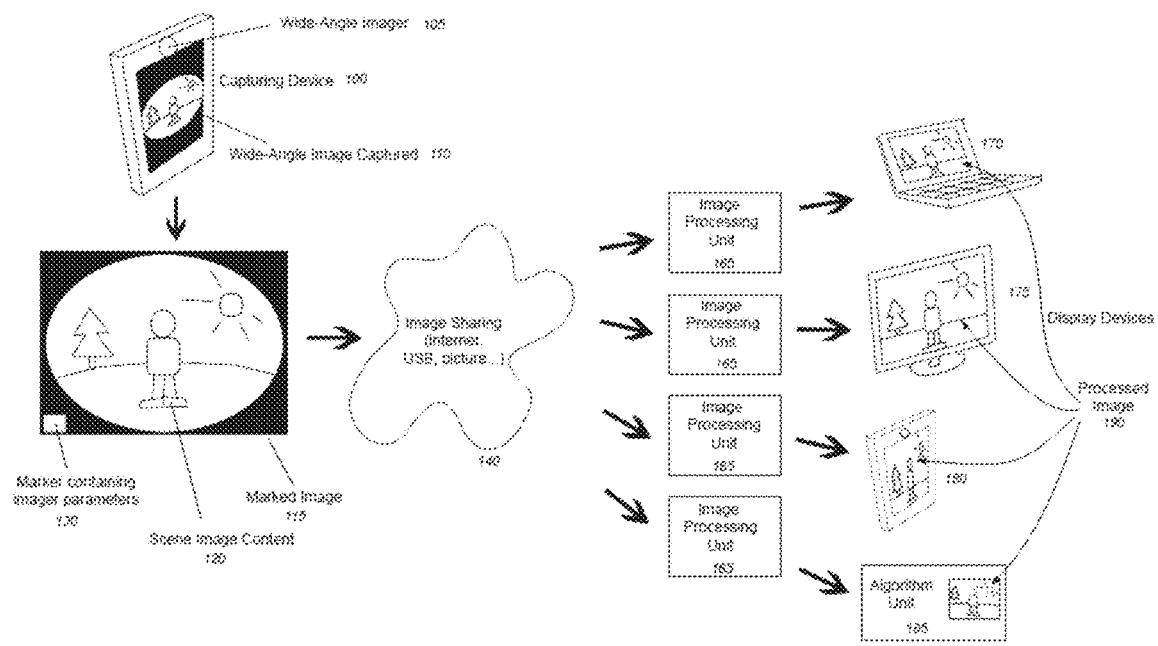
FIG. 1 is a schematic of the system for transferring imager parameters over a sharing medium to define a user experience or system behavior.

FIG. 1 shows a schematic of the system for transferring imager parameters over a sharing medium to define a user experience or system behavior. The process includes the following steps. A capturing device 100 is built with a wide-angle imager 105. The capturing device 100 is any apparatus on which a wide-angle imager could be added to add wide-angle imaging feature, including for example, but in no way limited to, a mobile phone, tablet, car, robot, TV, router, GPS unit, Internet box, home surveillance camera, security camera, automotive camera, endoscope, wearable device, watch or the like. When the wide-angle imager 105 is integrated in the capturing device 100, this device is able to capture a wide-angle image 110.

Here, the wide-angle imager 105 is any device capable of capturing images or part of images from a wide-angle environment. The resulting wide-angle environment preferably produces a wide-angle field of view. Some examples of a wide-angle imager 105 that can be used in the process are, but in no way limited to, wide angle lenses, catadioptric imagers, multiple narrow field of view cameras, computer generated wide-angle images, and the like. Some exemplary output of different wide-angle imagers 105 will be explained with respect to FIGS. 5A-G.

The wide-angle imager 105, by construction and depending on how it is used, has some intrinsic and extrinsic wide-angle imager parameters. Some examples of these parameters are, but in no way limited to, a distortion profile, an imaging field of view, some localized optical aberrations or image point-spread functions, lateral color, a 3-axis orientation and position, a cross-reference information between multiple marked images coming from a single wide-angle imager or different imagers, a geolocalization, a surrounding lighting, humidity or temperature conditions, a camera Bayer pattern, a signal-to noise ratio, the exposure parameters, the number of frames per seconds, color space parameters, the position inside the image of the central optical axis, orientation of the image footprint for non-symmetrical wide-angle images, the orientation and coordinates of one or multiple narrow field of view portion of the full panorama, the relative illumination of the lens, a unique identification code for the wide-angle lens to retrieve its distortion profile, localized relative illumination from a database (i.e., a table, list, spreadsheet, or the like stored locally or remotely), and the like.

In addition to wide-angle imager parameters, there are other kinds of parameters associated with the image, including, but in no way limited to, camera module identification, preferred processed image point of view coordinates (e.g., Pan, Tilt and Zoom), copyright data, pedestrian detection, tracking and recognition, face detection, tracking and recognition, speed and acceleration of the device, road lane departure, danger identification, 3D position tracking, 3D reconstruction, or the like.

All of these parameters and any other information that can be used to define a specific user experience or system behavior for the end user at the display device or the algorithm unit are part of the imager parameters contained in the marker 130.

While the complete knowledge of the imager parameters is useful for the end user or his device to generate the best user experience or system behavior, much of this data is traditionally lost between the wide-angle imager 105 and the end user, which embodiments of the present invention solve.

Figure 3:
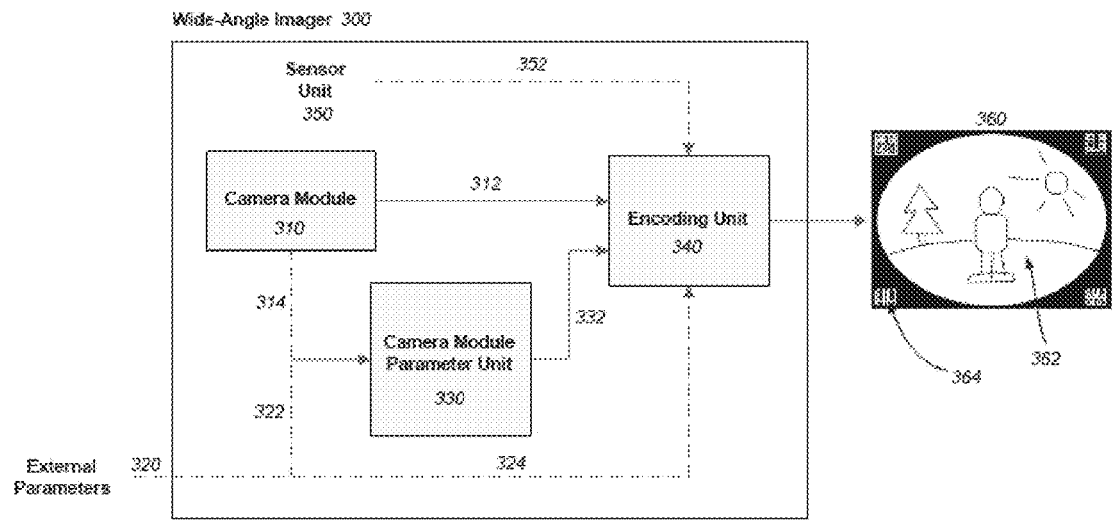
FIG. 3 is a schematic detailing the creation of the marked image at the imager device.

In a way that will be further explained with respect to FIG. 3, the wide-angle imager 105 outputs an marked image 115 that includes, inside the image frame, a combination of both the scene image content 120 from the wide-angle image captured 110 and a marker 130 in which all of the imager parameters associated with the image is encoded.

The marker 130 is any marker purposefully added to a part of the image to contain the imager parameters and allow transfer of the properties. Some examples of markers are, but in no way limited to, human-readable markers, computer-readable markers such as 1D or 2D bar codes including quick responses codes (QR-Code), watermarks, and the like. The marked images could contain a single or multiples markers. In the case of multiples markers, they could all have different complementary parameters or alternatively some parameters could be repeated in multiples markers for desired redundancy.

In the sharing between multiple devices shown in FIG. 1, marked image 115 outputted from the wide-angle imager and containing scene image content 120 and marker 130 is then shared across a sharing medium 140 (e.g., the "cloud"). Here, the sharing medium 140 is a concept that represents any kind of image sharing process including, but in no way limited to, transfer of digital images over the Internet, transfer via TCP-IP protocol, HDMI, USB, Firewire, memory, socket, transfer using a physical medium as a floppy disk, a laser disk, a magneto disk, a usb drive, a hard drive or transfer of the image through physically printing the image and then scanning it back into a digital file, and the like.

From the sharing medium 140, any display device 170, 175, or 180 or algorithm unit 185 including an image processing unit 165 may receive the marked image 115. In a way that will be further explained in FIG. 4, the image processing unit 165 uses the imager parameters encoded inside the marker 130 to correct or enhance image 190, displays information encoded in the marker 130 combined on image 190 or separately on another display, produce sound or light indicator output, produce a haptic feedback, or create a defined user experience or system behavior encoded inside the marker 130 to the end user.

The processed image 190 is a version of the original scene image content 120 processed by the image processing unit 165 using the imager parameters encoded inside the marker 130. In a preferred embodiment of the current innovation, the processed image 190 uses the distortion information and the orientation information from the wide-angle imager 105 to produce an optimally processed image of a sub-section of the full wide-angle image 120. In other embodiments, other distortion processing is done. Distortion processing is the action of digitally correcting, controlling, modifying and/or removing distortion from images or a section of an image. With the exact orientation of the wide-angle imager 105 known in real-time by the image processing unit 165, it is possible to process the distortion in the scene image content 120 optimally in a way that, but in no way limited to, keeps the processed image 190 centered on a specific location of the environment independently of the capturing device 100 movements or defines the appropriate navigation referential, allowing the calculation of the next processed image according to the user commands. These specific user experiences or system behaviors are possible only when their required imager parameters are available to the image processing device 165 after decoding them from the marker 130. It is thus the imager device that defines which specific user experiences or system behaviors can be used at the end user device.

In another embodiment of the present invention, instead of displaying the processed image 190 on display devices 170, 175 or 180, the processed image 190 is used inside a further algorithm unit 185 that processes the processed image to extract relevant information, including but in no way limited to, pedestrian detection, tracking and recognition, face detection, road lane departure, danger identification, 3D position tracking, 3D reconstruction, or the like.

Figure 2:
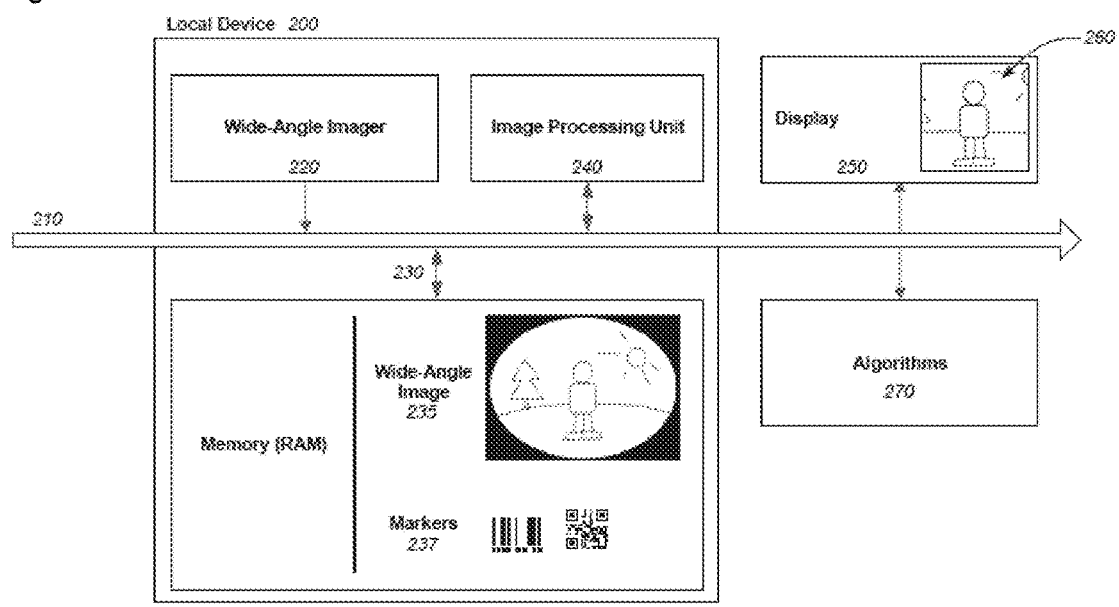
FIG. 2 is a schematic of the system for transferring imager parameters locally.

Referring to FIG. 2, an embodiment of the system for transferring information inside a single local device 200 is shown. The local device 200 here is any physical device that includes both the wide-angle imager 220 and the display unit 250 to correct, enhance image 260 and display associated information on image 260 or through another output system of the device like a sound, a light indicator or a haptic feedback. The image can also be recorded and later a specific user experience or system behavior can be reproduced with the device. The device could be, but is in no way limited to, a mobile phone, laptop, tablet, personal computer, server including a local client, a car, a digital still camera, a camcorder, a wearable device, a watch, or the like.

In a local device 200, the process transfers the output from the wide-angle imager 220 along a system bus 210. As in the multiple-device case of FIG. 1, the output of the wide-angle imager 220 is a wide-angle image 235 and a marker 237 in which the associated information is encoded and is exchanged with memory 230 along the bus. An image processing unit 240 is present on the bus 210 to receive the images 235 and markers 237 from memory 230 and to produce corrected and enhanced image 260, decode associated information, or reproduces user experience or system behavior on display 250. The final processed image 260 and associated information, user experience or system behavior are then sent to a local display unit 250 to display or a local algorithm unit 270 to use the processed image.

The automatic identification process shown in FIG. 1 for multiple devices and in FIG. 2 for a single local device includes an imager and an image processing unit.

FIG. 3 shows the detailed operations inside the wide-angle imager 105 and 220 from FIGS. 1 and 2 respectively. Inside the wide-angle imager 300, there is a camera module 310 that captures wide-angle environment information into an image file. The camera module 310 in a preferred embodiment is a wide-angle lens combined to an electronic image sensor as a CCD or a CMOS image sensor. The output from this camera module is the scene image content 312 sent to the encoding unit 340 and camera module parameters 314 sent to the camera module parameter unit 330. In other embodiments of the present invention, the camera module can be of any kind, including, but in no way limited to, a catadioptric lens, several narrow-angle camera modules, a wide-angle imager generating scene image content from a virtual environment, or the like.

In some embodiments of the present invention, optional external parameters 320 are added to allow any user, local or remote, to add some associated information, user experience or system behavior as mentioned in FIG. 1 to be encoded inside the image, including but in no way restricted to, camera module identification, preferred processed image point of view coordinate (e.g., Pan, Tilt and Zoom), navigation path, copyright data, speed or acceleration of a device, biometric parameters like heartbeat of a user holding the imager, zone of interest or danger in the image, status of other components of the device or the like. This external information is transferred through link 324 to the encoding unit 340 to be included inside the marker 364.

A camera module parameter unit 330 receives some identification information about the scene image content either from the camera module 310 via optional link 314 or from external parameters 320 via optional link 322. Having identified the camera module 310 producing the wide-angle image, the camera module parameter unit 330 outputs the camera module parameters 332 to the encoding unit 340. These camera module parameters include intrinsic information about the imager, including but in no way limited to, the distortion profile of a wide-angle lens in the camera module in table or polynomial form, the field of view of the image, the position inside the image of the central optical axis, orientation of the image footprint for non-symmetrical wide-angle images, the orientation and coordinates of one or multiple narrow field of view portions of the full scene, the relative illumination of the lens, a unique identification code for the wide-angle lens to retrieve either its distortion profile, field of view or localized relative illumination from a database (i.e., a table, list, spreadsheet, or the like stored locally or remotely), and the like.

In an embodiment of the current invention, the wide-angle imager 300 also includes an additional sensor unit 350 that could send sensor unit parameters 352 to the encoding unit 340 to be included in the encoded marker 364. These extrinsic parameters include, but are in no way limited to, the wide-angle imager spatial orientation, compass information, the geolocalization, the ambient light, temperature, pressure and humidity information, or the like.

The encoding unit 340 then encodes inside the marker 364 the camera module parameters 332, the optional external parameters 324, and the optional sensor unit parameters 352. The marker 364 is then combined with the camera module scene image content 312 to create the final output of the wide-angle imager 300, which is the marked image 360 that includes the scene image content 362 and the marker 364.

In a preferred embodiment of the present invention, the camera module scene image content 312 is the image from a wide-angle lens within the camera module and is identical to the outputted scene image content 362. This case will be later explained with respect to FIGS. 5A, 5B, and 5F in instances when an image cropping is done at the camera module level to increase camera frame rate.

Figure 5A:
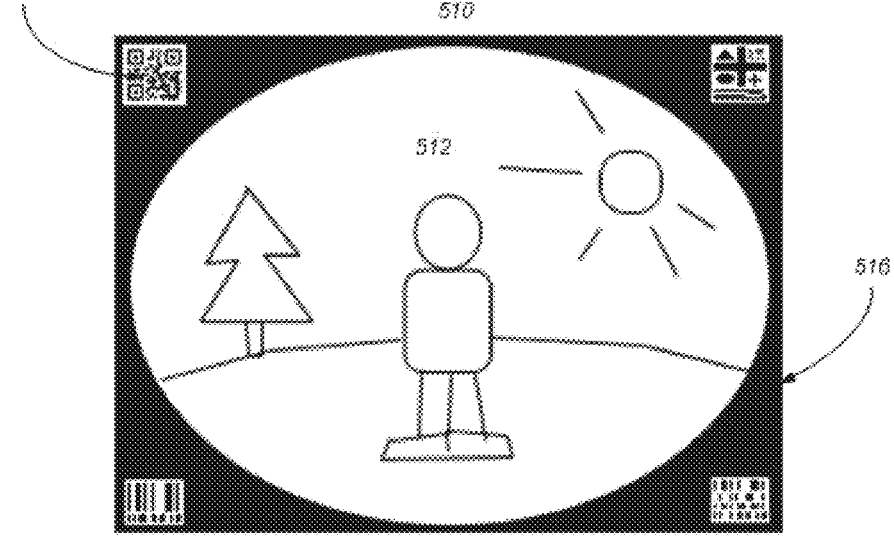
FIG. 5A is an example of a wide-angle image from a panomorph imager having elliptical scene image content with imager parameters encoded inside the image.
Figure 5B:
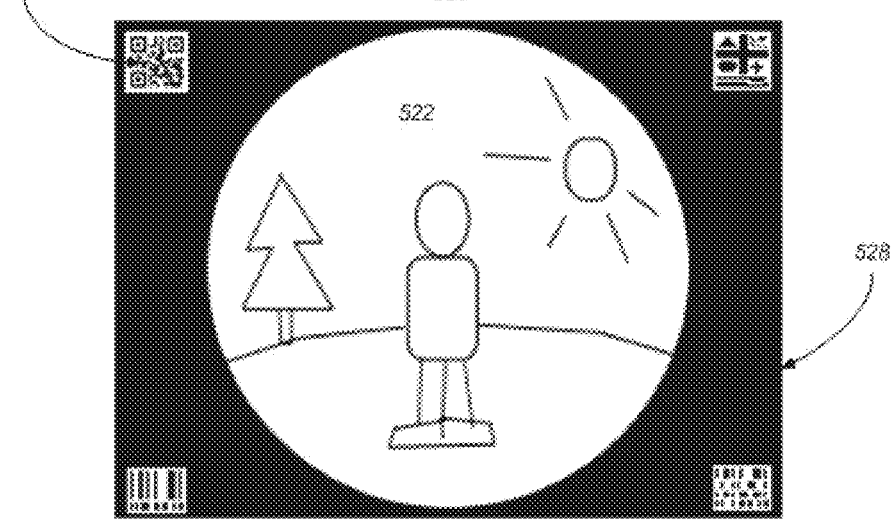
FIG. 5B is an example of a wide-angle image from a fisheye imager with circular scene image content with imager parameters encoded inside the image.
Figure 5C:
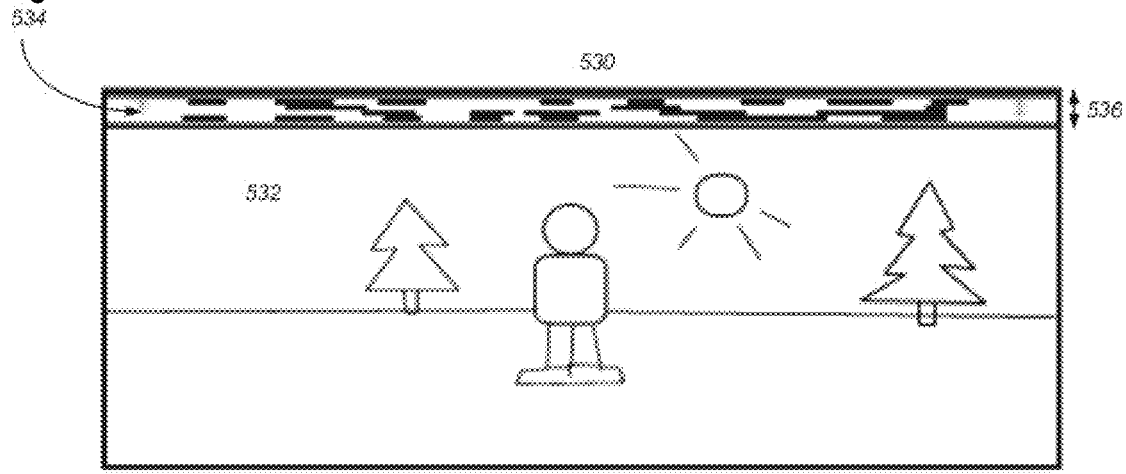
FIG. 5C is an example of a wide-angle image in equirectangular projection with imager parameters encoded in a margin added inside the image.
Figure 5D:
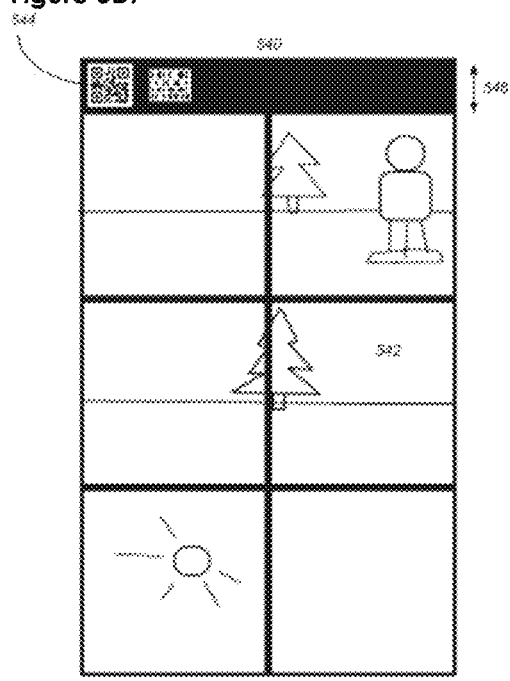
FIG. 5D is an example of a wide-angle image in cubic projection with imager parameters encoded inside the image.
Figure 5E:
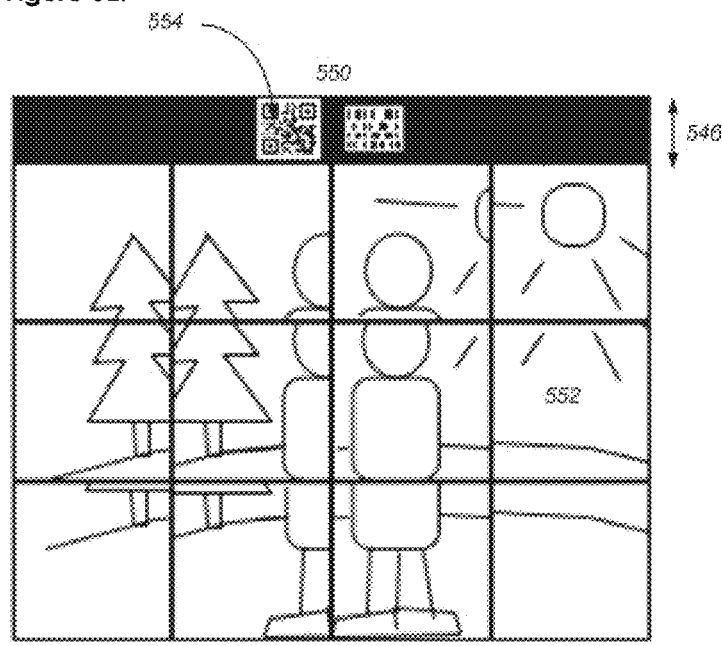
FIG. 5E is an example of a wide-angle image in yet to be stitched form with imager parameters encoded inside the image.
Figure 5F:
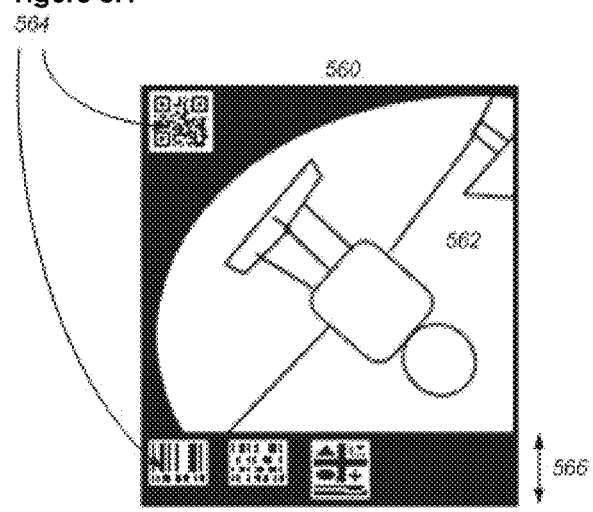
FIG. 5F is an example of a sub-section of the full wide-angle image with imager parameters encoded inside the image.
Figure 5G:
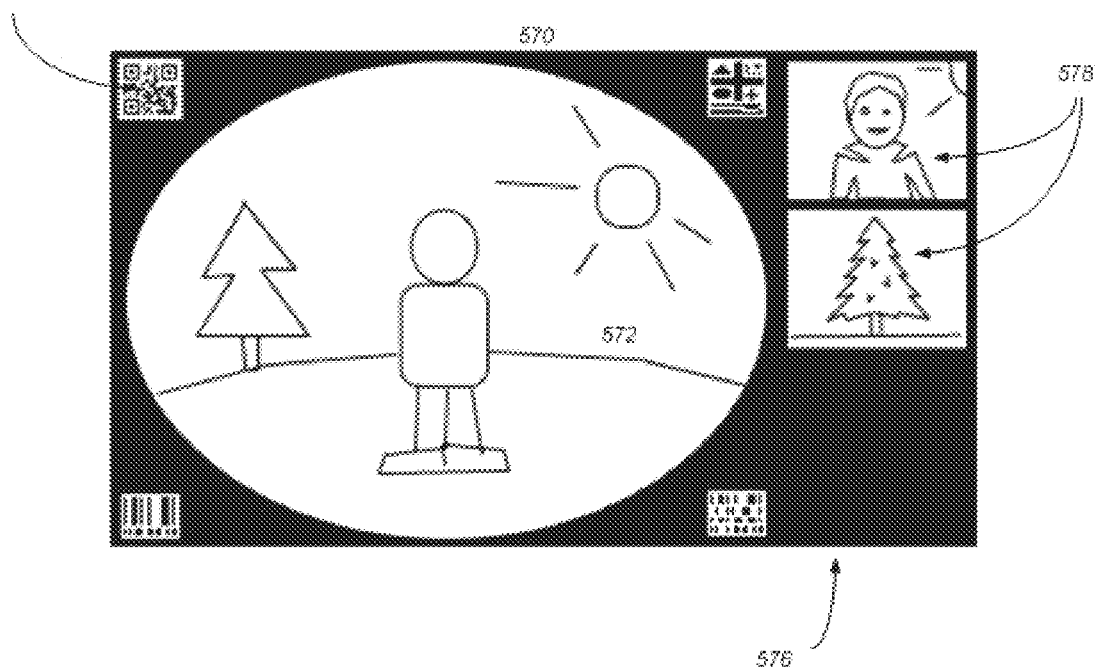
FIG. 5G is an example of combining content from multiples kind of wide-angle imagers in a wide-angle image with imager parameters encoded inside the image.

In another embodiment of the present invention, the outputted scene image content 362 is either the combination of multiple camera module scene image content 312 put directly together, as in FIGS. 5E and 5G, or the processed result of camera module scene image content 312 to produce a desired projection, as in FIGS. 5C, 5D, and 5F in instances when an image cropping is done at the encoding unit level to limit bandwidth.

Figure 4:
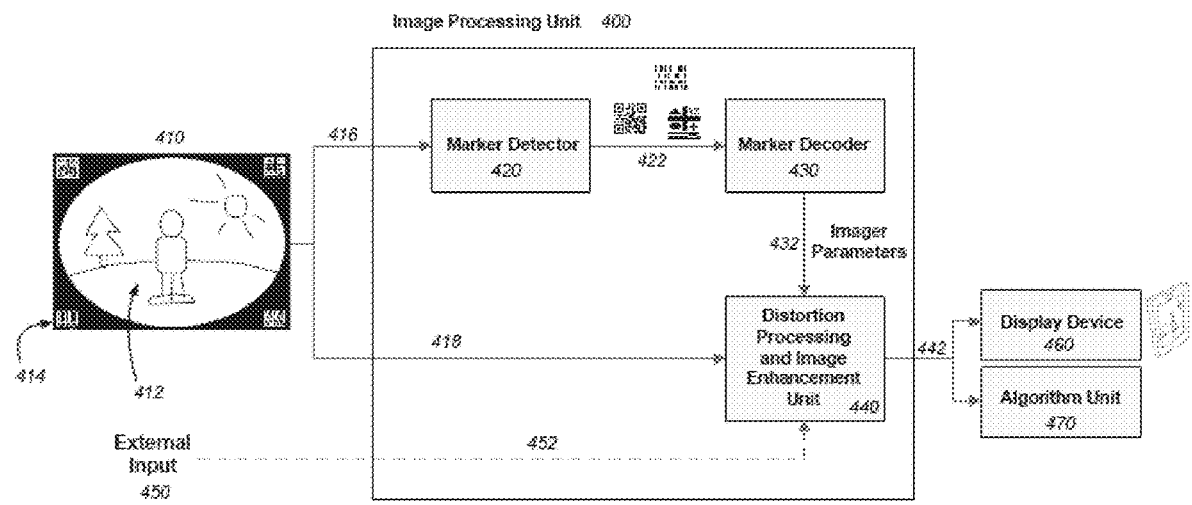
FIG. 4 is a schematic detailing the processing of the marked image at the image processing unit.

FIG. 4 shows the detailed operations inside the image processing unit 165 and 240 from FIGS. 1 and 2 respectively. Inside the image processing unit 400, there is a marker detector 420 that receives through link 416 the marked image 410 containing the scene image content 412 and the marker 414. The role of the marker detector 420 is to find the marker 414 inside the marked image 410 and to extract only the marker to output it through link 422 to the marker decoder 430.

The marker decoder 430 reads the markers from link 422 and outputs through link 432 all of the decoded imager parameters previously encoded inside the wide-angle imager 300 to a distortion processing and image enhancement unit 440.

The distortion processing and image enhancement unit 440 uses the scene image content 412 received through 418 from the marked image 410 and the associated information 432 to output corrected, enhanced images 442. Encoded information, user experience or system behavior also can be displayed or reproduced on images 442.

In a preferred embodiment of the present invention, by using imager parameters 432, the distortion processing and image enhancement unit 440 can digitally correct, control, modify, and/or remove the distortion from scene image content or a section of scene image content in order to provide a processed image 442 without geometrical distortions that are unpleasant for the observer.

In other embodiments of the present invention, by using the information 432, the distortion processing and image enhancement unit 440 can perform other enhancement including, but in no way limited to, lens shading compensation, lateral color compensation, color correction, white balance, de-noise, sharpen, dynamic expansion, virtual exposure, pixel interpolation, pixel subsampling, or the like.

In other embodiments of the present invention, the distortion processing and image enhancement unit 440 can also optionally receive external input 450 through link 452. Some examples of external input 450 are, but in no way limited to, user-selected viewing orientations and coordinates, navigation path in the image, digital zoom level, preferred point of interest, image enhancement parameters, image brightness, contrast, saturation, color temperature, and the like.

The processed images 442 are then used by either a display device 460 or an algorithm unit 470 as previously explained with respect to FIGS. 1 and 2.

The components of the systems described herein may be implemented in any combination of hardware and software. For example, each component may be implemented as a dedicated processor, controller, ASIC, or the like. Alternatively, components may be implemented as software, firmware, or the like in a single controller or processor. Combinations are also possible.

Seven examples of output marked images that can be the resulting output of different embodiments of wide-angle imagers depending on the camera module properties and the wide-angle imager settings are shown at FIGS. 5A-G.

FIG. 5A shows an example marked image 510 in the case where the camera module inside the wide-angle imager is a wide-angle lens producing a non-symmetrical camera module scene image content which is exactly reproduced to the scene image content 512. With this kind of camera module inside the wide-angle imager, there are black corners 516 in the image and the markers 514 are usually added there to make sure the scene image content 512 is not altered.

FIG. 5B shows an example marked image 520 in the case where the camera module inside the wide-angle imager is a wide-angle lens producing a symmetrical camera module scene image content which is exactly reproduced to the scene image content 522. With this kind of camera module inside the wide-angle imager, there are black corners 526 in the image and the markers 524 are usually added there to make sure the scene image content 522 is not altered.

FIG. 5C shows an example marked image 530 where the scene image content 532 is displayed through a known projection. In the exact case of this example, the projection shown is the equirectangular projection, but other projections could be used as cylindrical, rectilinear, Mercator, sinusoidal, or the like. The content provided from the camera module scene image content is transformed to this projection by the encoding unit. With this equirectangular projection of FIG. 5C, the scene image content is covering the whole image and an extra black margin 536 must be added to include the markers 534. To minimize extra margin dimensions, the marker in that case could be rearranged on a one pixel or a few pixel line or column.

FIG. 5D shows an example marked image 540 where the scene image content 542 is displayed through a known projection. In the exact case of this example, the projection shown is the cubic projection, but other projections could be used. The content provided from the camera module scene image content is transformed to this projection by the encoding unit. With this cubic projection, the scene image content is covering the whole image and an extra black margin 546 must be added to include the markers 544. To minimize extra margin dimensions, the marker in that case could be rearranged on a one or a few pixel line or column.

FIG. 5E shows an example marked image 550 where the scene image content 552 is a combination of several narrow-angle image that could later be stitched together to form a continuous wide-angle image. The content provided from the camera module scene image content could be the results of several camera modules or a single camera module used with different orientations. The way each narrow-angle image is ordered is determined by the encoding unit and the parameters of each narrow-angle image is included inside the marker 554. The marker 554 is added in an existing black region or extra margin 556. To minimize extra margin dimensions, the marker in that case could be rearranged on a one or a few pixel line or column.

FIG. 5F shows an example marked image 560 where the scene image content 562 is either a sub-region of the full camera module scene image content after image cropping by the encoding unit or a sub-region of the full panorama after image cropping by the camera module. Depending on the sub-region used, there could be or not a black margin 566 and one could be added if necessary to include the marker 564 without altering the scene image content. In that particular example, the wide-angle imager parameters encoded inside marker 564 would also include the orientation, coordinate and zoom level of this sub-region compared to the full scene image content. To minimize extra margin dimensions, the marker in that case could be rearranged on a one or a few pixel line or column.

FIG. 5G shows an example where multiple scene image contents 572 and 578 are added together on the same marked image 570. The camera modules producing each camera module scene image content could be identical as in the case of two hemispheric scene image content captured together to form a full sphere or different as in the illustrated case where two high detail images from a narrow-angle camera are combined to a low-detail wide-angle camera. The black region 576 to add marker 574 would then be selected by the encoding unit doing the combination.

In all of the above figures, the imager parameters are transferred from the imager to the image processing unit through the marked image and are used to define the specific user experience or system behavior for the end user. Some example of specific user experience or system behavior depending on the imager parameters are explained here. These are basic example to better understand the innovation and in no way should limit the scope and spirit of the present invention.

The first example is an imager found in a portable or a wearable device like a smartphone, a tablet, a smart watch, a personal video recording device part of clothing or strapped to a user or the like. In addition of recording the video images of the scene around the user, the imager could records some biometric data of the user like heartbeat, pace, the number of steps as well as orientation and geolocalization parameters. It could also automatically include information on linked devices from other users in proximity or a linked mean of transportation used by the user like smart running shoes, a bicycle or a car. A specific user experience in that case would allow the end user that read the marked images from the video to review the scene image content recorded and navigate in it using proper image distortion correction without having knowledge of the exact model of the imager that created the distorted image. This is especially useful if the original user uploaded the video on the Internet and the end user would otherwise have no information on the exact model of the imager used. Furthermore, the orientation in real-time of the imager device encoded in the marker could be used for image stabilization at the display to lock the view on a specific point of interest even if the device was moving during the activity. Another specific user experience in this example would be the user of this device for helping review physical training activities like running or a bicycle ride. The end user could use the information from the marked image to compare the heartbeat during the activity to the video image showing the context (road inclination, terrain type, weather conditions). The user could also use the geolocalization parameters to draw a map of his activity with optional display of the scene image content if desired. The information from a linked device of a mean of transport (smart running shoes or bicycle) or from friendly users could be used to automatically log the physical activity type or to tag friends in the activity without the user having to manually enter it each time. Another user experience could be if this wearable imager is included in clothing of a law-enforcement officer. After an intervention, the scene image content, geolocalization and biometric data of the officer can help to better reconstruct a critical event after it happened.

The second example is for an imager found in a home surveillance security imager. This device could be a security camera, a webcam, a smart electronic appliance or the like. This device, in addition of recording the scene image content, can encode inside the marker some parameters like the date and time, the orientation, the zone of interest where movement was automatically detected by an algorithm unit, a status of the door lock using a smart lock system or the status of an alarm system, name and location in the image of identified users, privacy zones and the like. The specific user experience can be to allow a remote user to watch the security video in real-time and be able to navigate inside the processed image with removed distortion without having to enter manually the imager parameters like the lens distortion profile or the orientation of the device. Since the end user navigation on the user interface is preferably different depending on whether the imager is on the ceiling, a wall or a ground orientation, this automatic transfer of the orientation parameter allows the end user to have optimal navigation without having to enter the parameters manually. Another user experience or system behavior could be for an insurance company wanting to look at some parameters after a burglary, but that cannot have full access to the scene image content for privacy reasons. They could then display the status of the door lock or the alarm system with the date and time to determine the conditions during the burglary. Another type of user experience or system behavior that can be defined by the imager parameters could be a privacy zone. The whole video feed could be encrypted and then only a given display device with the right password could display the video feed. On that display device, different user with different username and password could be shown different zones of the scene image content, with the privacy region scene content being removed only for a user without the required privilege.

A third example is for an imager comprising multiple camera modules, each module with their own lens. This could be a device with two wide-angle lenses with over 180° field of view configured in back to back positions to image the full spherical scene around the imager or this could be an imager with a high number of narrow-angle lenses in all different directions, covering the full or part of the full spherical scene around the imager. In one case of this example, the imager could create a marked image where the scene image content from all the camera modules has already been merged together to form a single image with the full spherical scene content and a marker could contain imager parameters related to the specific projection used when combining the images or any other imager parameter that could be used by the end user. In another case of this example, the output of the imager could be the multiple marked images from the multiple cameras. The markers in this case would be used to cross-reference all the marked imaged together. The temporal reference could be done with an image sequence number or a date and time. The spatial reference could be done by defining the position and orientation of each camera module toward the others or toward a fixed position and orientation reference coordinate in the imager. In this example, the specific user experience could be to display as desired by the end user either the original images pointing in the orientation of interest in the spherical scene or alternatively to display a full spherical scene view in which the user can navigate freely inside the scene by using the imager parameters from the marked images. Alternatively, the full spherical scene content could be used to display a stabilized view on a specific point of interest, locking the orientation of the view even if the imager was moving during the capture by using the orientation parameters of the imager encoded inside the markers. In another user experience, both of the full spherical scene and the narrow images could be displayed at the same time, the full spherical scene being used to navigate inside the original narrow images by using all the cross-reference information encoded inside the markers. One last user experience or system behavior could be the case where the end user receives only some or all of the original narrower marked images and want to combine them using the position and orientation information encoded inside the markers.

One last example is for an imager found on an automotive vehicle like a car driving on a road or a drone in the sky or a robotized machine. This imager could be a classical car with a human driver, a drone controlled by a remote human, a driverless car or a self-guided drone. In the last two cases of intelligent autonomous system, the end user is an artificial intelligence unit, a computer or the device itself. With these automotive vehicles, the imager could record the scene image content from the view in front of the car or drone as well as many imager parameters. These parameters could include weather parameters (outside temperature, wind, precipitation and humidity), date and time, geolocalization, altitude, position on the scene image content of detected dangers, or detected road lanes, parameters with the speed and acceleration of the automotive device, identification of the driver and passengers, status of the brakes or windshield wipers, detected road signs or the like. A specific user experience in this case would be looking at recorded scene image content and other parameters after an incident to help better understand what happened. In that case, the imager parameters could include the imager distortion profile to allow an optimal image processing to remove the distortion. One display could then show the processed scene image content, showing what happened before, during and after the incident. Another user experience or system behavior could be to display some parameters of the device without looking at the image, like the date and time, the speed and acceleration, the status of the wipers and the brakes or the outside weather. This could be useful for an insurance company wanting to determine the exact conditions that lead to the incident when the scene image content cannot be revealed for privacy reasons. Another user experience could be to display in real-time to the driver some information detected by an algorithm unit. This information could be detected road lanes departure, road signs or dangers. In this case, the output could be in the form of a text parameter, a symbol, a sound, a light indicator, a haptic feedback or an alarm. One specific system behavior in the cases of intelligent autonomous systems would be to provide to the computer or artificial intelligence unit the important imager parameters for self-guidance through the marked images. In this case, the specific system behavior is the parameters the artificial intelligence unit or computer system is able to provide to its sub-systems through the markers and how it can adapt the guidance based on these parameters.

All of the above are figures and examples of specific user experiences or system behaviors that can be defined by the imager parameters that are encoded inside the marked image from the imager. In all these examples, the imager can have any field of view, from very narrow to extreme wide-angle. They are not intended to be exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A system for automatically defining a user experience or system behavior related to a scene image content using a printed marked image, the system comprising:
   (a) an imager configured to capture or generate the scene image content;
   (b) an encoding unit configured to receive the scene image content from the imager and combine the scene image content with at least one marker to create the marked image, at least one imager parameter that is used by the display device or the algorithm unit to automatically define the user experience or system behavior being encoded into the marker, the at least one imager parameter including at least one of information associated with: (i) a characteristic of a lens of the imager, (ii) one or more components of the imager, the information associated with the one or more components of the imager being provided by at least one internal or external sensor unit, or (iii) an environment around the imager, the information associated with the environment around the imager being provided by an external sensor unit or being provided as external information by a user; and (c) a printing device configured to physically print the marked image.

2. The system of claim 1 wherein the imager includes at least one camera module configured to capture an image.

3. The system of claim 2, wherein the at least one imager parameter includes at least one camera module parameter or an external parameter, the system further comprising a camera module parameter unit that transfers the at least one camera module parameter or external parameter to the encoding unit and an external unit that can provide additional external parameter directly to the encoding unit.

4. The system of claim 3, wherein the external unit comprises a sensor unit and the external parameter is a sensor parameter.

5. The system of claim 2, wherein the camera module includes at least a lens and an image sensor configured to capture an image received by the lens.

6. The system of claim 2, wherein the camera module is a digital processor configured to capture an image from a virtual environment.

7. The system of claim 2, wherein at least a portion of the camera module parameters are generated automatically by analyzing the scene image content captured by the camera module.

8. The system of claim 1 wherein the imager is a wide-angle imager.

9. The system of claim 1 where the imager parameters are at least one of an orientation of the imager, scene image content position, orientation and size, an imager model, a speed or acceleration of the imager, an entry point or a zone of interest.

10. The system of claim 1, wherein the marker is one of a human-readable code, a machine-readable code, or a watermark.

11. The system of claim 10, where the marker is a QR code.

12. The system of claim 1, wherein the user experience or system behavior further includes processing a distortion of the captured image according to the at least one imager parameter, the at least one imager parameter including at least one of a lens distortion profile, a field of view of the distorted image, a position inside the distorted image of a central optical axis, orientation of an image footprint, orientation and coordinates of one or more narrow fields of view, a relative illumination of a lens, digital zoom level, a preferred point of interest, or image enhancement parameters.

13. The system of claim 1, wherein the user experience or system behavior further includes processing a distortion of the captured image according to the at least one imager parameter, the at least one imager parameter including a unique identification code related to a database containing at least one of a distortion profile, field of view, or localized relative illumination of a lens of the imager.

14. The system of claim 1, wherein the imager parameters include a navigation path in the scene image content.

15. The system of claim 1, wherein the marker is located in a corner of the marked image or in an added margin of the marked image.

16. The system of claim 1, wherein the marked image is divided into a plurality of image parts, each of the plurality of image parts including a respective marker, and wherein data for processing the marked image includes a cross reference to the plurality of image parts.

17. A system for automatically defining a user experience or system behavior related to a scene image content captured by an imager using a printed marked image, the printed marked image including the scene image content and at least one marker, the system comprising:

(a) a device configured to create a digital marked image file from the printed marked image;

(b) an image processing unit configured to process the scene image from the digital marked image file according to the defined user experience or system behavior;

(c) a marker detector configured to identify and extract the marker from the digital marked image file; and (d) a marker decoder configured to decode the marker to obtain and output imager parameters that are encoded in the marker, the imager parameters including at least data that is used by the image processing unit to automatically define the user experience or system behavior, the imager parameters including at least one of information associated with: (i) a characteristic of a lens of the imager, (ii) one or more components of the imager, the information associated with the one or more components of the imager being provided by at least one internal or external sensor unit, or (iii) an environment around the imager, the information associated with the environment around the imager being provided by an external sensor unit or being provided as external information by a user.

18. The system of claim 17, wherein the image processing unit further receives data from a source external to the system, the image processing unit being configured to further process the scene image content based in part on the external data.

19. The system of claim 17, the imager parameters include at least one of user-selected viewing orientations and coordinates, digital zoom level, a preferred point of interest, image enhancement parameters, image brightness, image contrast, saturation, or color temperature.

20. The system of claim 17, wherein the marker is one of a human-readable code, a machine-readable code, or a watermark.

21. The system of claim 20, where the marker is a QR code.

22. The system of claim 17, wherein the defined user experience or system behavior includes processing a distortion of the scene image content according to the imager parameters, the imager parameters including a unique identification code related to a database containing at least one of a distortion profile, field of view, or localized relative illumination of a lens.

23. The system of claim 17, wherein the defined user experience or system behavior includes processing a distortion of the scene image content according to the imager parameters, the imager parameters including at least one of a lens distortion profile, a field of view of the distorted image, a position inside the distorted image of a central optical axis, orientation of an image footprint, orientation and coordinates of one or more narrow fields of view, a relative illumination of a lens, digital zoom level, a preferred point of interest, or image enhancement parameters.

24. The system of claim 17, wherein the image processing unit is configured to further process the scene image content based in part on at least one of a lens shading compensation, lateral color compensation, color correction, white balance, de-noise, sharpen, dynamic expansion, virtual exposure, pixel interpolation, pixel subsampling or custom cropping zone.

25. The system of claim 17, wherein the marker is one of located in a corner of the marked image or provided in an added margin of the marked image.

26. A system for automatically defining a user experience or system behavior related to a scene image content captured by an imager using a printed marked image, the printed marked image including the scene image content and a marker, the system comprising:
  (a) a device configured to create a digital marked image file from the printed marked image;
  (b) an image processing unit configured to process the digital marked image file and output the imager parameters or indicators based on the image parameters
  (c) a marker detector configured to identify and extract the marker from the digital marked image file; and
  (d) a marker decoder configured to decode the marker to obtain and output imager parameters that are encoded in the marker, the imager parameters including at least data that is used by the image processing unit to automatically define the user experience or system behavior, the imager parameters including at least one of information associated with: (i) a characteristic of a lens of the imager, (ii) one or more components of the imager, the information associated with the one or more components of the imager being provided by at least one internal or external sensor unit, or (iii) an environment around the imager, the information associated with the environment around the imager being provided by an external sensor unit or being provided as external information by a user.

\* \* \* \* \*